United States Patent
Prasad et al.

(10) Patent No.: US 11,100,061 B2
(45) Date of Patent: Aug. 24, 2021

(54) AUTOMATICALLY PURGING DATA USING A DEEP NEURAL NETWORK

(71) Applicant: EMC IP Holding Company LLC, Hopkinton, MA (US)

(72) Inventors: Parmeshwr Prasad, Bangalore (IN); Shishir Choubey, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 297 days.

(21) Appl. No.: 16/256,400

(22) Filed: Jan. 24, 2019

(65) Prior Publication Data

US 2020/0242090 A1 Jul. 30, 2020

(51) Int. Cl.
*G06F 16/215* (2019.01)
*G06N 3/08* (2006.01)
*G06N 3/04* (2006.01)
*G06F 16/901* (2019.01)

(52) U.S. Cl.
CPC .......... *G06F 16/215* (2019.01); *G06F 16/901* (2019.01); *G06N 3/0481* (2013.01); *G06N 3/08* (2013.01); *G06N 3/084* (2013.01)

(58) Field of Classification Search
CPC ....... G06F 16/215; G06F 16/254; G06N 3/08; G06N 3/0481; G06Q 10/06; G06Q 10/0633; G06Q 10/103; G06Q 10/10; G06Q 10/06316
See application file for complete search history.

(56) References Cited

U.S. PATENT DOCUMENTS

| 6,163,773 | A | 12/2000 | Kishi | |
| 6,564,198 | B1* | 5/2003 | Narayan | G06K 9/00369 706/60 |
| 9,792,530 | B1 | 10/2017 | Wu et al. | |
| 10,706,026 | B1* | 7/2020 | Hansen | G06F 16/235 |
| 2017/0091658 | A1* | 3/2017 | Matthiesen | G06F 21/45 |
| 2018/0225568 | A1 | 8/2018 | Chandramouli | |
| 2020/0057675 | A1* | 2/2020 | Dias | G06F 9/48 |
| 2020/0233955 | A1* | 7/2020 | Ramzan | G06F 9/5027 |

OTHER PUBLICATIONS

Dancey, Darren, David A. McLean, and Zuhair A. Bandar. "Decision tree extraction from trained neural networks." American Association for Artificial Intelligence, 2004. (Year: 2004).*

* cited by examiner

*Primary Examiner* — Jesse P Frumkin
(74) *Attorney, Agent, or Firm* — Ryan, Mason & Lewis, LLP (57) ABSTRACT

Methods, apparatus, and processor-readable storage media for automatically purging data using a deep neural network are provided herein. An example computer-implemented method includes training a neural network model using multiple types of attribute data and job-related data associated with historical workflow data maintained within multiple data structures of an enterprise system; dynamically analyzing workflows derived from the enterprise system, wherein dynamically analyzing the workflows comprises determining the multiple types of attribute data for the workflows and processing job-related data associated with the workflows into multiple data structures within one or more databases; applying the neural network model to the determined attribute data; and removing at least a portion of the multiple data structures from the one or more databases based at least in part on the application of the neural network model to the determined attribute data.

20 Claims, 6 Drawing Sheets

AUTOMATICALLY PURGING DATA USING A DEEP NEURAL NETWORK

FIELD

The field relates generally to information processing systems, and more particularly to techniques for data management in such systems.

BACKGROUND

Workflows are generated in enterprise systems in numerous ways. For example, change requests can create multiple workflows, workflow execution can trigger other workflows, and human intervention in such systems can create new workflows. Additionally, workflows commonly create multiple jobs in order to complete a lifecycle, for example, of a change request. Each such job often creates non-trivial amounts of data, with such data potentially accumulating in difficult-to-manage quantities in databases and database management systems. For instance, such quantities of job-related data can cause systems to incur delays or experience other performance issues.

Data purging can potentially ameliorate these issues. However, conventional data purging approaches typically remove job-related data from a database based exclusively on a static pre-specified temporal schedule. Such approaches, though, still incur significant system burdens, and such approaches are unable to discriminate among various types of job-related data while purging, further limiting the effectiveness of the approaches.

SUMMARY

Illustrative embodiments of the disclosure provide techniques for automatically purging data using a deep neural network. An exemplary computer-implemented method includes training at least one neural network model using multiple types of attribute data and job-related data associated with historical workflow data maintained within multiple data structures of at least one enterprise system. Such a method also includes dynamically analyzing workflows derived from the at least one enterprise system, wherein dynamically analyzing the workflows comprises determining at least a portion of the multiple types of attribute data for the workflows and processing job-related data associated with the workflows into multiple data structures within one or more databases. Additionally, such a method includes applying the at least one neural network model to the determined attribute data for the workflows, and removing at least a portion of the multiple data structures from the one or more databases based at least in part on the application of the at least one neural network model to the determined attribute data.

Illustrative embodiments can provide significant advantages relative to conventional data purging techniques. For example, challenges associated with the inherent inflexibility and inefficiency of such techniques are overcome through the implementation of a neural network trained on the basis of multiple types of attribute data pertaining to workflows.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
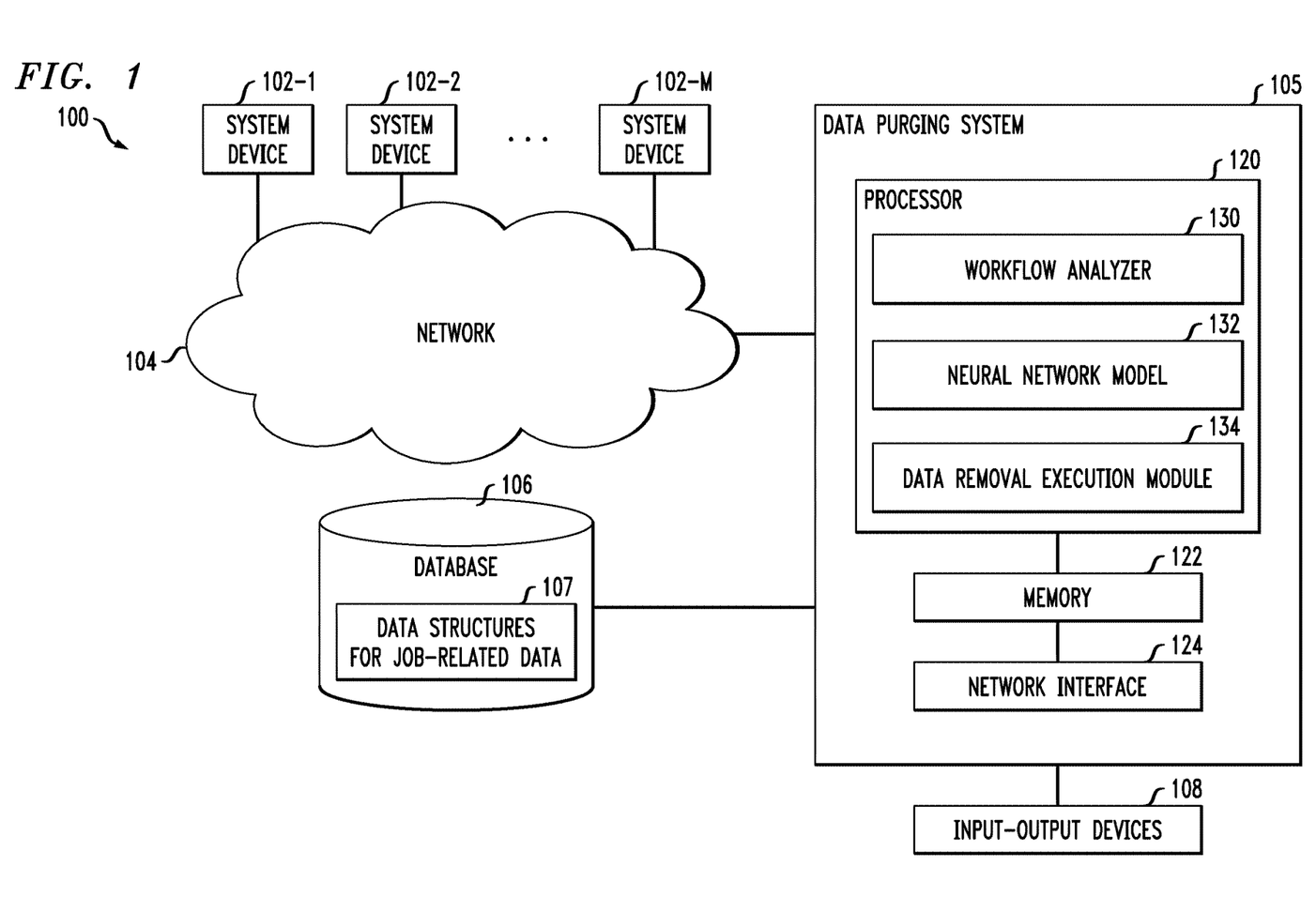
FIG. 1 shows an information processing system configured for automatically purging datasets using a deep neural network in an illustrative embodiment.

FIG. 1 shows a computer network (also referred to herein as an information processing system) 100 configured in accordance with an illustrative embodiment. The computer network 100 comprises a plurality of system devices 102-1, 102-2, . . . 102-M, collectively referred to herein as system devices 102. The system devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is data purging system 105.

The system devices 102 may comprise, for example, mobile telephones, laptop computers, tablet computers, desktop computers or other types of computing devices. Such devices are examples of what are more generally referred to herein as "processing devices" or "computing devices." Some of these processing devices are also generally referred to herein as "computers."

The system devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user," as used herein, is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the data purging system 105 can have an associated database 106 configured to store data structures 107 pertaining to job-related data, as further detailed herein.

The database 106 in the present embodiment is implemented using one or more storage systems associated with the data purging system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the data purging system 105 are input-output devices 108, which illustratively comprise keyboards, displays or other types of input-output devices in any combination. Such input-output devices can be used, for example, to support one or more user interfaces to the data purging system 105, as well as to support communication between the data purging system 105 and other related systems and devices not explicitly shown.

The data purging system 105 in the FIG. 1 embodiment is assumed to be implemented using at least one processing device. Each such processing device generally comprises at least one processor and an associated memory, and implements one or more functional modules for controlling certain features of the data purging system 105.

More particularly, the data purging system 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the data purging system 105 to communicate over the network 104 with the system devices 102, and illustratively comprises one or more conventional transceivers.

The processor 120 further comprises a workflow analyzer 130, a neural network model 132, and a data removal execution module 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the workflow analyzer 130, neural network model 132, and data removal execution module 134 may be implemented at least in part in the form of software that is stored in memory 122 and executed by processor 120.

It is to be understood that the particular set of elements shown in FIG. 1 for automatically purging datasets using a deep neural network involving system devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing workflow analyzer 130, neural network model 132, and data removal execution module 134 of an example data purging system 105 in computer network 100 will be described in more detail with reference to the flow diagram of FIG. 5.

Figure 2:
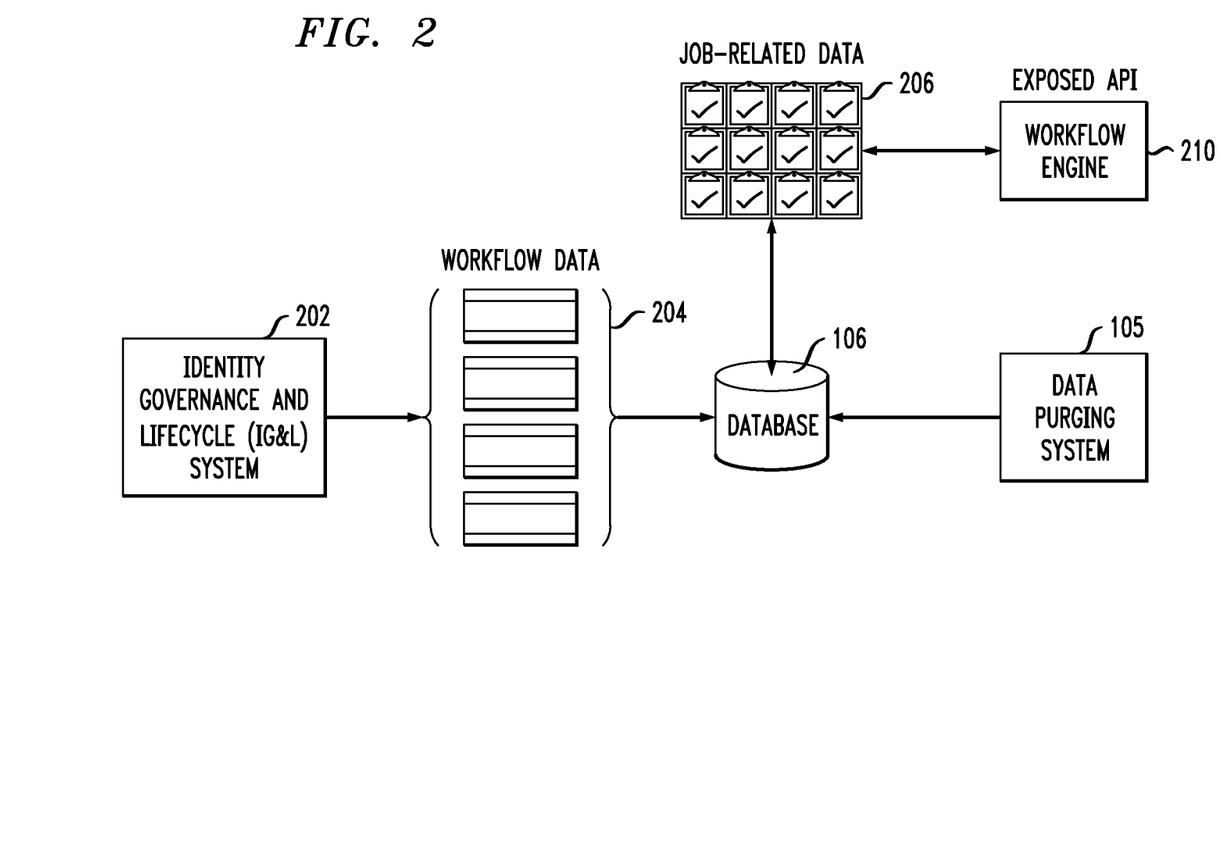
FIG. 2 shows example system architecture in an illustrative embodiment.

FIG. 2 shows example system architecture in an illustrative embodiment. By way of illustration, FIG. 2 depicts an identity governance and lifecycle (IG&L) system 202, which provides workflow data 204 to database 106. Based at least in part on the provided workflow data 204, multiple jobs 206 (along with corresponding job-related data) can be generated in connection with database 106 and a workflow engine 210. Additionally, as further detailed herein, data purging system 105 can interact with database 106 to purge certain data structures from database 106, which will improve performance of IG&L system 202.

As described herein, one or more embodiments include implementing a neural network (NN) to model IG&L job data purging based at least in part on various attributes of workflow data. Such a model can be trained, for example, using existing or historical workflow data patterns, as well as data pertaining to different states of related jobs.

As noted above, various attributes of workflow data are used as input to train a neural network model. Such attributes can include, for example, a workflow generation attribute, a work item attribute, a workflow engine job consumption attribute, a dependent workflow attribute, a database access attribute, and a job retry in workflow engine attribute. More specifically, the workflow generation attribute includes information such as the number of customer-generated change request ($CR_n$), the number of child workflows associated with a parent workflow ($C_n$), and the average number of workflows generated at a particular deployment (N). Accordingly, this attribute category will generate a [$CR_n$, $C_n$, N] input to the neural network.

Additionally, the work item attribute includes information pertaining to the average time taken to approve a request ($T_{av}$), and the number of automated approvals in an overall approval process (Auto). Accordingly, this attribute category will generate a [$T_{av}$, Auto] input to the neural network. The workflow engine job consumption attribute includes information pertaining to the average number of workflow instances started in a workflow engine ($J_n$) and the time taken by the workflow engine to complete a job ($T_i$). Accordingly, this attribute category will generate a [$J_n$, $T_i$] input to the neural network.

The dependent workflow attribute includes information pertaining to object identifiers (OID) for workflow instances. Accordingly, this attribute category will generate a list of dependent workflows with any OID ($D_n$), as well as the state of each dependent OID ($OID_s$). Also, the database access attribute includes a list of OIDs currently accessing the database (OID{L}), the number of entries created by any OID ($E_i$), and the number of queries to the database based on OID (OID{n}). Further, the job retry in workflow engine attribute includes a list of OID which were involved in a retry (OID {r}) and triggered a job, which are monitored by a job monitor ($JM_n$).

Figure 3:
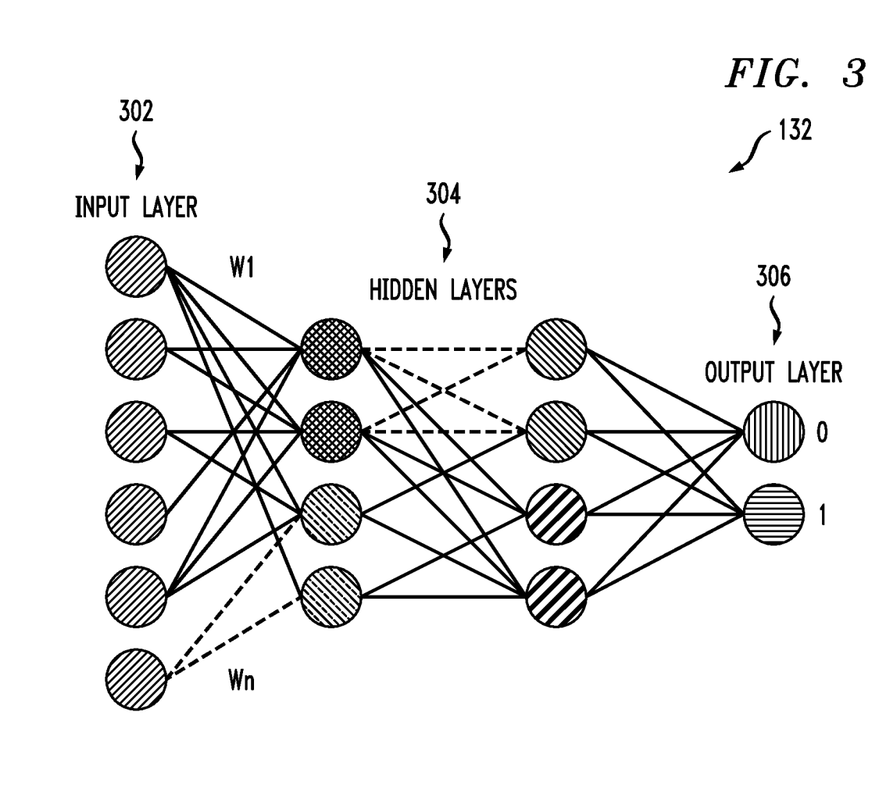
FIG. 3 shows an example neural network model in an illustrative embodiment.

FIG. 3 shows an example neural network model 132 in an illustrative embodiment. By way of illustration, FIG. 3 depicts an input layer 302, one or more hidden layers 304, and an output layer 306. More specifically, the neural network model 132 takes input from different attributes (as detailed above) in the form of input layer 302, and all of the attributes then go through one or more hidden layers 304 of the neural network model 132. In one or more embodiments, all of the inputs in the different layers (such as input layer 302 and hidden layers 304) will have an activation function as well as corresponding weights (which help the network to reach a desired output) and biases. By way of example, an activation function ($a_n$) can include the following: $a_0(i)=\Sigma (w_0*a_0+w_1*a_1w_n*a_n+b_0)$, wherein $\Sigma$ represents a sigmoid function, w represents a weight value, and $b_0$ represents a bias value (which can correct the activation function). In one or more embodiments, a kernel initializer is used to obtain a weight for each layer and each neuron, wherein each weight is determined based on the association between the attribute and the desired output.

As also illustrated in FIG. 3, the neural network model 132 will generate a one (1) or a zero (0) as an output at the output layer 306. The above-noted sigmoid function will determine this output (that is, either 1 or 0) with respect to each OID and corresponding input data. If the output of the sigmoid function is 1, that indicates that the job-related data (and/or the data structure related thereto) can be deleted from the database. Alternatively, if the output of the sigmoid function is 0, that indicates that the job-related data cannot be deleted and the OID will be used again to model the network.

Figure 4:
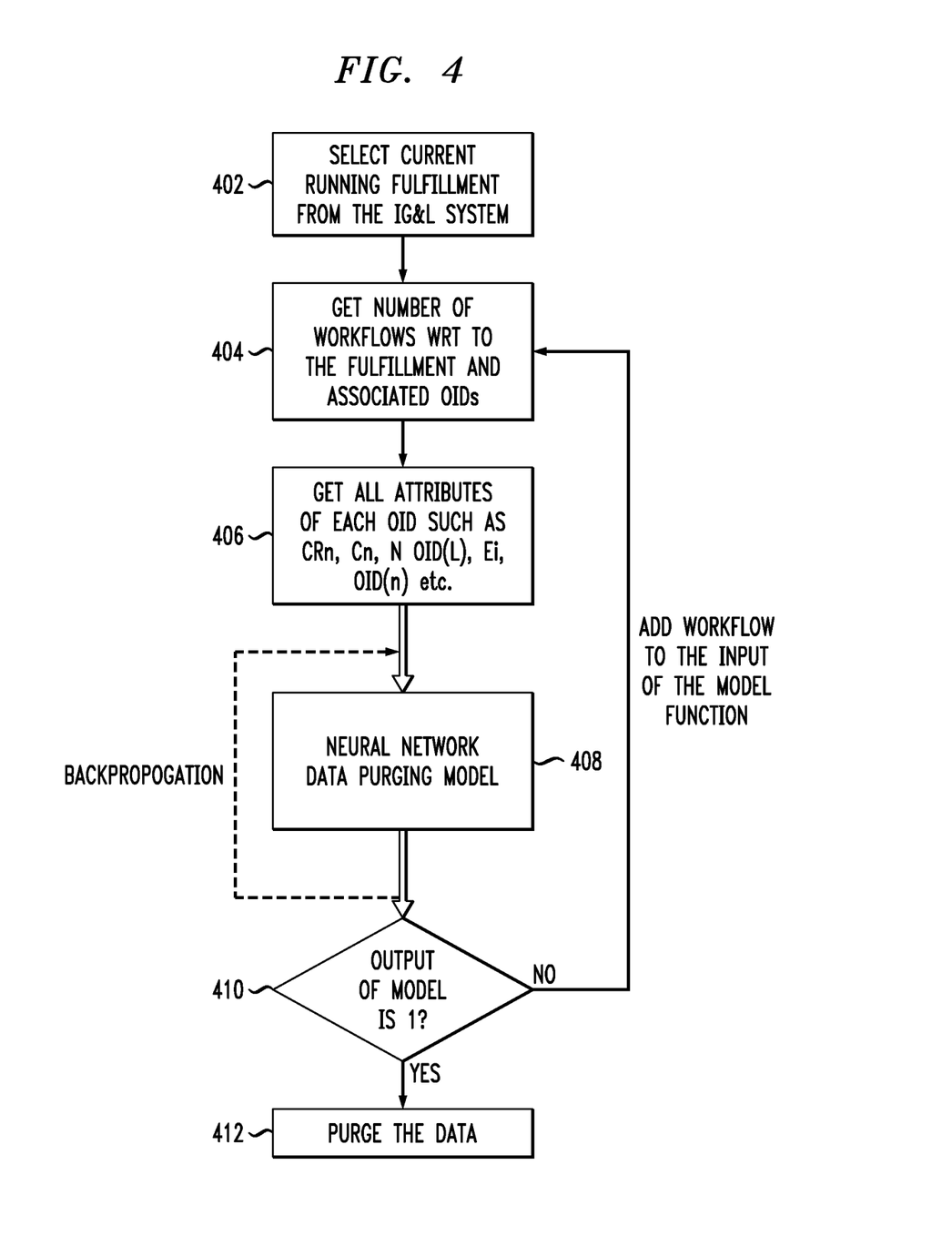
FIG. 4 shows an identity governance and lifecycle neural network model data flow with purging logic in an illustrative embodiment.

FIG. 4 shows an identity governance and lifecycle neural network model data flow with purging logic in an illustrative embodiment. Step 402 includes selecting a current running fulfillment from an IG&L system. Step 404 includes obtaining the number of workflows with respect to the fulfillment as well as any associated OIDs. Step 406 includes obtaining all attributes of each OID, wherein such attributes can include $CR_n$, $C_n$, N, $T_{av}$, Auto, $J_n$, $T_i$, $D_n$, $OID_s$, OID{L}, $E_i$, OID{n}, OID{r}, $JM_n$), etc. The obtained attributes are provided as input to the neural network data purging model in step 408. The network model will generate an output in the form of 0 or 1, and step 410 includes determining if the output is 1. If yes (that is, the output is 1), then step 412 includes purging the data (and/or the data structure related thereto). If no (that is, the output is 0), then the workflow is added to the input of the model function (via step 404).

Additionally, in at least one embodiment, backpropagation logic in the network model is used to adjust and strengthen the output of the network model such that any particular weight can be changed to make the input data more effective. The implementation of such backpropagation logic will help in correcting the network model to make it more suitable for a particular environment.

Figure 5:
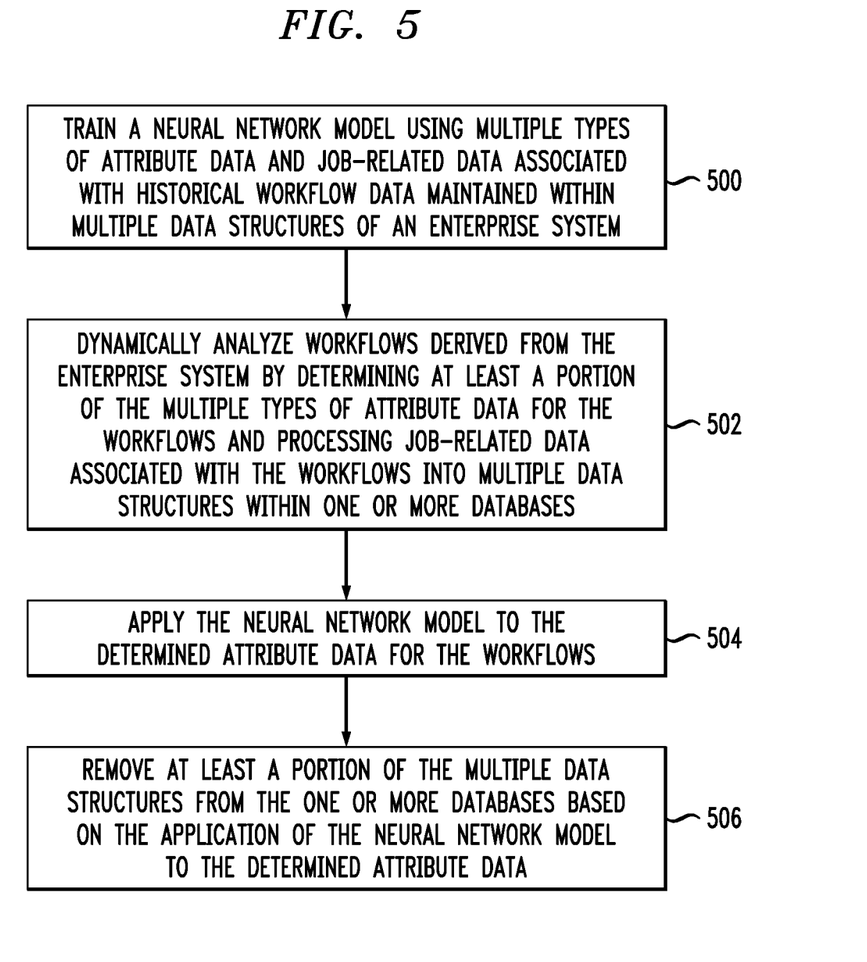
FIG. 5 is a flow diagram of a process for automatically purging data using a deep neural network in an illustrative embodiment.

FIG. 5 is a flow diagram of a process for automatically purging data using a deep neural network in an illustrative embodiment. It is to be understood that this particular process is only an example, and additional or alternative processes can be carried out in other embodiments.

In this embodiment, the process includes steps 500 through 506. These steps are assumed to be performed by the processor 120 utilizing its modules 130, 132 and 134.

Step 500 includes training at least one neural network model using multiple types of attribute data and job-related data associated with historical workflow data maintained within multiple data structures of at least one enterprise system. The multiple types of attribute data can include workflow generation attribute data, wherein the workflow generation attribute data include at least one of data pertaining to users generating one or more change requests, data pertaining to the number of children workflows associated with one or more parent workflows, and data pertaining to the average number of workflows generated at a particular deployment. The multiple types of attribute data can also include work item attribute data, wherein the work item attribute data include at least one of data pertaining to the average time taken to approve a request, and the number of automated approvals in a given approval process.

Additionally, the multiple types of attribute data can include workflow engine job consumption attribute data, wherein the workflow engine job consumption attribute data include at least one of data pertaining to the average number of workflow instances started in the workflow engine, and data pertaining to time taken by the workflow engine to complete a given job. Further, the multiple types of attribute data can include dependent workflow attribute data, wherein the dependent workflow attribute data include data pertaining to a unique workflow identifier of each workflow instance. Also, the multiple types of attribute data can include database access attribute data, wherein the database access attribute data include at least one of data pertaining to unique workflow identifiers currently accessing the one or more databases, data pertaining to the number of entries created by a given unique workflow identifier, and data pertaining to the number of queries submitted to the one or more databases according to unique workflow identifier.

Step 502 includes dynamically analyzing workflows derived from the at least one enterprise system, wherein dynamically analyzing the workflows comprises determining at least a portion of the multiple types of attribute data for the workflows and processing job-related data associated with the workflows into multiple data structures within one or more databases.

Step 504 includes applying the at least one neural network model to the determined attribute data for the workflows. Applying the at least one neural network model to the determined attribute data can include executing a sigmoid function on the determined attribute data and outputting, for each item of the processed job-related data, an indication that the item of job-related data is to be removed from the multiple data structures or an indication that the item of job-related data is to be maintained in the multiple data structures. Additionally, at least one embodiment includes carrying out additional training of the at least one neural network model based at least in part on the outputs of the sigmoid function.

Step 506 includes removing at least a portion of the multiple data structures from the one or more databases based at least in part on the application of the at least one neural network model to the determined attribute data.

Additionally, the techniques depicted in FIG. 5 can also include assigning a weight to each of the multiple types of attribute data based at least in part on an association between the given type of attribute data and job-related data removal, and incorporating the assigned weights to the at least one neural network model.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to carry out job-related data and/or data structure purging using a neural network. These and other embodiments can effectively improve the performance of an IG&L system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a data purging storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
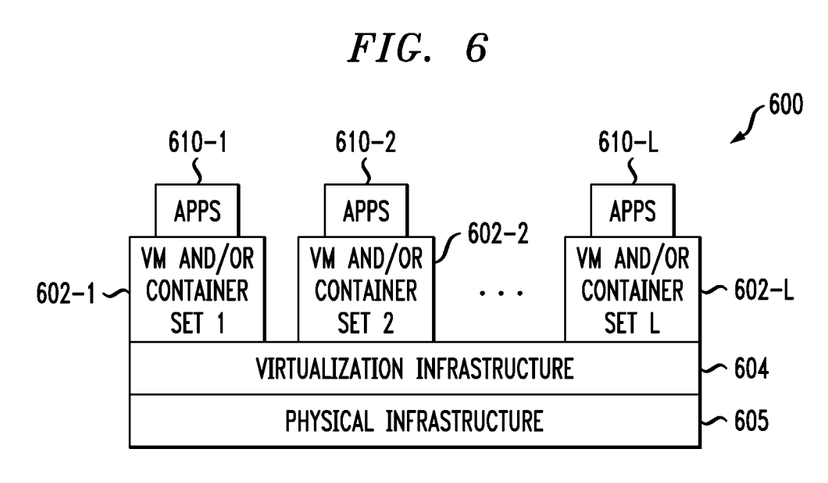
FIGS. 6 and 7 show examples of processing platforms that may be utilized to implement at least a portion of an information processing system in illustrative embodiments.
Figure 7:
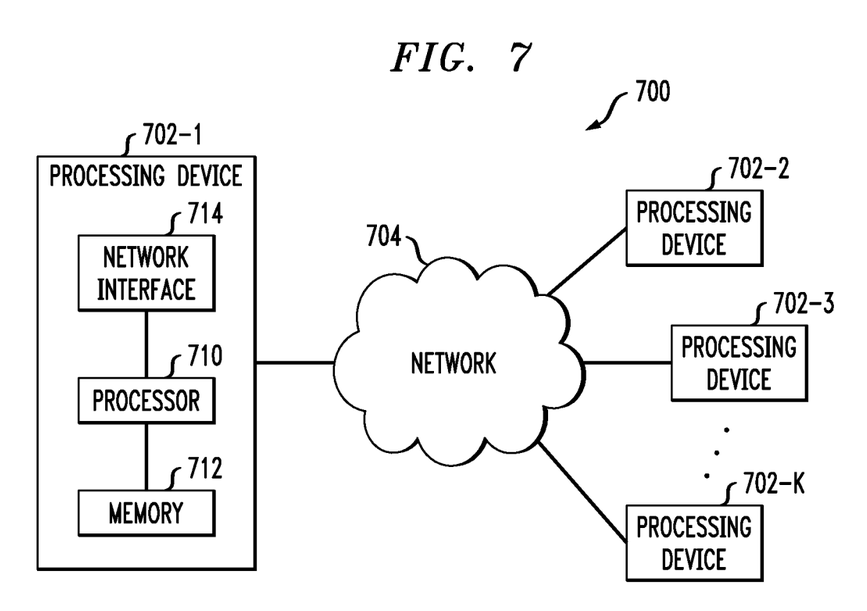

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

An example of a hypervisor platform used to implement a hypervisor within the virtualization infrastructure 604 is the VMware® vSphere® which has an associated virtual infrastructure management system such as the VMware® vCenter™. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
training, using backpropagation logic, at least one neural network model using multiple types of attribute data and job-related data associated with historical workflow data maintained within multiple data structures of at least one enterprise system;
dynamically analyzing workflows derived from the at least one enterprise system, wherein dynamically analyzing the workflows comprises determining at least a portion of the multiple types of attribute data for the workflows and processing job-related data associated with the workflows into multiple data structures within one or more databases;
obtaining an initial weight for each of the multiple types of attribute data using a kernel initializer;
assigning updated weights to the multiple types of attribute data based at least in part on (i) the obtained initial weights and (ii) at least one association between the given type of attribute data and job-related data removal;
incorporating the assigned weights and at least one bias value to the at least one neural network model;
applying the at least one neural network model to the determined attribute data for the workflows;

removing at least a portion of the multiple data structures from the one or more databases based at least in part on the application of the at least one neural network model to the determined attribute data; and dynamically adjusting, using the backpropagation logic, the at least one neural network model based at least in part on results from the removing of the at least a portion of the multiple data structures from the one or more databases;

wherein the method is performed by at least one processing device comprising a processor coupled to a memory.

2. The computer-implemented method of claim 1, wherein the multiple types of attribute data comprise workflow generation attribute data.

3. The computer-implemented method of claim 2, wherein the workflow generation attribute data comprise at least one of data pertaining to users generating one or more change requests, data pertaining to the number of children workflows associated with one or more parent workflows, and data pertaining to the average number of workflows generated at a particular deployment.

4. The computer-implemented method of claim 1, wherein the multiple types of attribute data comprise work item attribute data.

5. The computer-implemented method of claim 4, wherein the work item attribute data comprise at least one of data pertaining to the average time taken to approve a request, and the number of automated approvals in a given approval process.

6. The computer-implemented method of claim 1, wherein the multiple types of attribute data comprise workflow engine job consumption attribute data.

7. The computer-implemented method of claim 6, wherein the workflow engine job consumption attribute data comprise at least one of data pertaining to the average number of workflow instances started in the workflow engine, and data pertaining to time taken by the workflow engine to complete a given job.

8. The computer-implemented method of claim 1, wherein the multiple types of attribute data comprise dependent workflow attribute data.

9. The computer-implemented method of claim 8, wherein the dependent workflow attribute data comprise data pertaining to a unique workflow identifier of each workflow instance.

10. The computer-implemented method of claim 1, wherein the multiple types of attribute data comprise database access attribute data.

11. The computer-implemented method of claim 10, wherein the database access attribute data comprise at least one of data pertaining to unique workflow identifiers currently accessing the one or more databases, data pertaining to the number of entries created by a given unique workflow identifier, and data pertaining to the number of queries submitted to the one or more databases according to unique workflow identifier.

12. The computer-implemented method of claim 1, wherein applying the at least one neural network model to the determined attribute data comprises executing a sigmoid function on the determined attribute data and outputting, for each item of the processed job-related data, an indication that the item of job-related data is to be removed from the multiple data structures or an indication that the item of job-related data is to be maintained in the multiple data structures.

13. The computer-implemented method of claim 12, further comprising:

carrying out additional training of the at least one neural network model based at least in part on the outputs of the sigmoid function.

14. A non-transitory processor-readable storage medium having stored therein program code of one or more software programs, wherein the program code when executed by at least one processing device causes the at least one processing device:

to train, using backpropagation logic, at least one neural network model using multiple types of attribute data and job-related data associated with historical workflow data maintained within multiple data structures of at least one enterprise system;

to dynamically analyze workflows derived from the at least one enterprise system, wherein dynamically analyzing the workflows comprises determining at least a portion of the multiple types of attribute data for the workflows and processing job-related data associated with the workflows into multiple data structures within one or more databases;

to obtain an initial weight for each of the multiple types of attribute data using a kernel initializer;

to assign updated weights to the multiple types of attribute data based at least in part on (i) the obtained initial weights and (ii) at least one association between the given type of attribute data and job-related data removal;

to incorporate the assigned weights and at least one bias value to the at least one neural network model;

to apply the at least one neural network model to the determined attribute data for the workflows;

to remove at least a portion of the multiple data structures from the one or more databases based at least in part on the application of the at least one neural network model to the determined attribute data; and to dynamically adjust, using the backpropagation logic, the at least one neural network model based at least in part on results from the removing of the at least a portion of the multiple data structures from the one or more databases.

15. The non-transitory processor-readable storage medium of claim 14, wherein applying the at least one neural network model to the determined attribute data comprises executing a sigmoid function on the determined attribute data and outputting, for each item of the processed job-related data, an indication that the item of job-related data is to be removed from the multiple data structures or an indication that the item of job-related data is to be maintained in the multiple data structures.

16. The non-transitory processor-readable storage medium of claim 15, wherein the program code when executed by at least one processing device further causes the at least one processing device:

to carry out additional training of the at least one neural network model based at least in part on the outputs of the sigmoid function.

17. An apparatus comprising:

at least one processing device comprising a processor coupled to a memory;

the at least one processing device being configured:

to train, using backpropagation logic, at least one neural network model using multiple types of attribute data and job-related data associated with historical workflow data maintained within multiple data structures of at least one enterprise system;

to dynamically analyze workflows derived from the at least one enterprise system, wherein dynamically analyzing the workflows comprises determining at least a portion of the multiple types of attribute data for the workflows and processing job-related data associated with the workflows into multiple data structures within one or more databases;

to obtain an initial weight for each of the multiple types of attribute data using a kernel initializer;

to assign updated weights to the multiple types of attribute data based at least in part on (i) the obtained initial weights and (ii) at least one association between the given type of attribute data and job-related data removal;

to incorporate the assigned weights and at least one bias value to the at least one neural network model;

to apply the at least one neural network model to the determined attribute data for the workflows;

remove at least a portion of the multiple data structures from the one or more databases based at least in part on the application of the at least one neural network model to the determined attribute data; and to dynamically adjust, using the backpropagation logic, the at least one neural network model based at least in part on results from the removing of the at least a portion of the multiple data structures from the one or more databases.

18. The apparatus of claim 17, wherein applying the at least one neural network model to the determined attribute data comprises a executing a sigmoid function on the determined attribute data and outputting, for each item of the processed job-related data, an indication that the item of job-related data is to be removed from the multiple data structures or an indication that the item of job-related data is to be maintained in the multiple data structures.

19. The apparatus of claim 18, wherein the at least one processing device is further configured:

to carry out additional training of the at least one neural network model based at least in part on the outputs of the sigmoid function.

20. The apparatus of claim 17, wherein the multiple types of attribute data comprise workflow generation attribute data, work item attribute data, workflow engine job consumption attribute data, dependent workflow attribute data, and database access attribute data.

* * * * *

UNITED STATES PATENT AND TRADEMARK OFFICE
CERTIFICATE OF CORRECTION

PATENT NO. : 11,100,061 B2
APPLICATION NO. : 16/256400
DATED : August 24, 2021
INVENTOR(S) : Parmeshwr Prasad and Shishir Choubey It is certified that error appears in the above-identified patent and that said Letters Patent is hereby corrected as shown below:

In the Claims

In Claim 17, Column 13, Lines 19-22, replace:
"remove at least a portion of the multiple data structures from the one or more databases based at least in part on the application of the at least one neural network model to the determined attribute data; and"
With:
-- to remove at least a portion of the multiple data structures from the one or more databases based at least in part on the application of the at least one neural network model to the determined attribute data; and --

In Claim 18, Column 14, Lines 4-7, replace:
"wherein applying the at least one neural network model to the determined attribute data comprises a executing a sigmoid function on the determined attribute data and outputting,"
With:
-- wherein applying the at least one neural network model to the determined attribute data comprises executing a sigmoid function on the determined attribute data and outputting, --

Signed and Sealed this
Twelfth Day of December, 2023

Katherine Kelly Vidal
*Director of the United States Patent and Trademark Office*